(12) United States Patent
Bookheimer et al.

(10) Patent No.: US 10,850,332 B1
(45) Date of Patent: Dec. 1, 2020

(54) HOLLOW SHANK TOOL HOLDER

(71) Applicant: Kennametal Inc., Latrobe, PA (US)

(72) Inventors: Alan Bookheimer, Latrobe, PA (US); Ruy Frota De Souza Filho, Latrobe, PA (US)

(73) Assignee: KENNAMETAL INC., Latrobe, PA (US)

( * ) Notice: Subject to any disclaimer, the term of this patent is extended or adjusted under 35 U.S.C. 154(b) by 0 days.

(21) Appl. No.: 16/438,115

(22) Filed: Jun. 11, 2019

(51) Int. Cl.
*B23B 31/26* (2006.01)

(52) U.S. Cl.
CPC ........ *B23B 31/265* (2013.01); *B23B 2231/14* (2013.01); *Y10T 409/30952* (2015.01); *Y10T 409/309464* (2015.01)

(58) Field of Classification Search
CPC ......... B23B 31/265; Y10T 409/309408; Y10T 409/309464; Y10T 409/30952
See application file for complete search history.

(56) References Cited

U.S. PATENT DOCUMENTS

| | | | |
|---|---|---|---|
| 6,045,308 A | 4/2000 | Frank et al. | |
| 6,083,146 A | 7/2000 | Earley, Jr. | |
| 6,481,940 B2 * | 11/2002 | Prust | B23B 31/265 408/240 |
| 6,813,965 B2 | 11/2004 | Sailing | |
| 6,843,623 B2 * | 1/2005 | Geissler | B23Q 1/70 409/231 |
| 6,979,157 B2 | 12/2005 | Kleiner | |
| 7,311,482 B2 | 12/2007 | Sugita et al. | |
| 7,325,471 B2 | 2/2008 | Massa et al. | |
| 8,096,737 B2 * | 1/2012 | Tada | B23B 31/02 408/67 |
| 9,238,269 B2 * | 1/2016 | Nakai | B23B 31/005 |
| 9,694,429 B2 * | 7/2017 | Haimer | B23B 31/265 |
| 9,839,965 B2 * | 12/2017 | Englund | B23B 31/4006 |
| 2006/0034670 A1 | 2/2006 | Sugita | |
| 2010/0308546 A1 | 12/2010 | Maier et al. | |
| 2012/0189397 A1 * | 7/2012 | Bozkurt | B23B 31/026 409/135 |
| 2013/0115023 A1 | 5/2013 | Haimer | |
| 2015/0028548 A1 | 1/2015 | Haimer | |

FOREIGN PATENT DOCUMENTS

| | | |
|---|---|---|
| DE | 4303118 A1 | 8/1994 |
| DE | 102004054550 A1 | 5/2006 |
| DE | 102011116572 A1 | 4/2013 |
| WO | WO2006050952 A1 | 5/2006 |
| WO | 2016207218 A1 | 12/2016 |

* cited by examiner

*Primary Examiner* — Eric A. Gates
(74) *Attorney, Agent, or Firm* — Larry R. Meenan

(57) ABSTRACT

Hollow shank tool holders including stress reduction features that result in a more reliable stronger tool holder are disclosed. The tool holders include an elliptical undercut contoured relief surface adjacent to the clamping surface to substantially reduce or eliminate a stress point. The elliptical undercut allows for no changes to be made to the clamping surfaces of the tool holder.

26 Claims, 11 Drawing Sheets

US 10,850,332 B1

HOLLOW SHANK TOOL HOLDER

FIELD OF THE INVENTION

The present invention relates to tool holders, and more particularly relates to clamping force stress reduction features for hollow shank tool holders.

BACKGROUND INFORMATION

Hollow shank tool holders are utilized for high-speed, close-tolerance machining. In order to increase the performance of hollow shank tool holders, operators are using reduced rotation speed and removing an increased amount of material. To allow for an increased amount of material to be removed the rigidity of the connection between the tool holder and spindle may be maximized. To maximize the rigidity of the connection, a higher clamping force between the tool holder and the spindle may be used. However, when the clamping force between the tool holder and spindle is increased the stress in the tool holder can become too high leading to tool holder failures.

Conventional hollow shank tool holders include a radius between a clamping surface and a remainder of the inner diameter of the tool holder. The failure of the tool holder due to the increased clamping force on the clamping surface often occurs at the radius between the clamping surface and the inner diameter of the tool holder.

SUMMARY OF THE INVENTION

Hollow shank tool holders are provided that include stress reduction features that result in a more reliable stronger tool holder. The tool holders include a contoured relief surface adjacent to the clamping surface to substantially reduce or eliminate a stress point. The contoured relief surface allows for no changes to be made to the clamping surfaces of the tool holder.

An aspect of the present invention is to provide hollow shank tool holder comprising a taper shank portion structured and arranged to receive a clamping assembly of a spindle unit, the taper shank portion comprising a mounting end having an opening, the opening defining a longitudinal axis of the hollow shank tool holder extending from the mounting end to a cutting end of hollow shank tool holder, and an inner peripheral surface, the inner peripheral surface comprising a radially inwardly extending collar adjacent to the mounting end extending along the longitudinal axis from the opening, a clamp retaining surface extending from the radially inwardly extending collar, a contoured relief surface extending from the clamp retaining surface, and a radially outwardly tapered surface extending from the contoured relief surface tapered along the longitudinal axis toward the mounting end.

Another aspect of the present invention is to provide a hollow shank tool holder assembly comprising a spindle unit comprising a spindle, a draw bar and at least one clamping finger, and a hollow shank tool holder comprising a taper shank portion structured and arranged to receive a clamping assembly of a spindle unit, the taper shank portion comprising a mounting end having an opening, the opening defining a longitudinal axis of the hollow shank tool holder extending from the mounting end to a cutting end of hollow shank tool holder, and an inner peripheral surface, the inner peripheral surface comprising a radially inwardly extending collar adjacent to the mounting end extending along the longitudinal axis from the opening, a clamp retaining surface extending from the radially inwardly extending collar, a contoured relief surface extending from the clamp retaining surface, and a radially outwardly tapered surface extending from the contoured relief surface tapered along the longitudinal axis toward the mounting end.

These and other aspects of the present invention will be more apparent from the following description.

DETAILED DESCRIPTION

Figure 1:
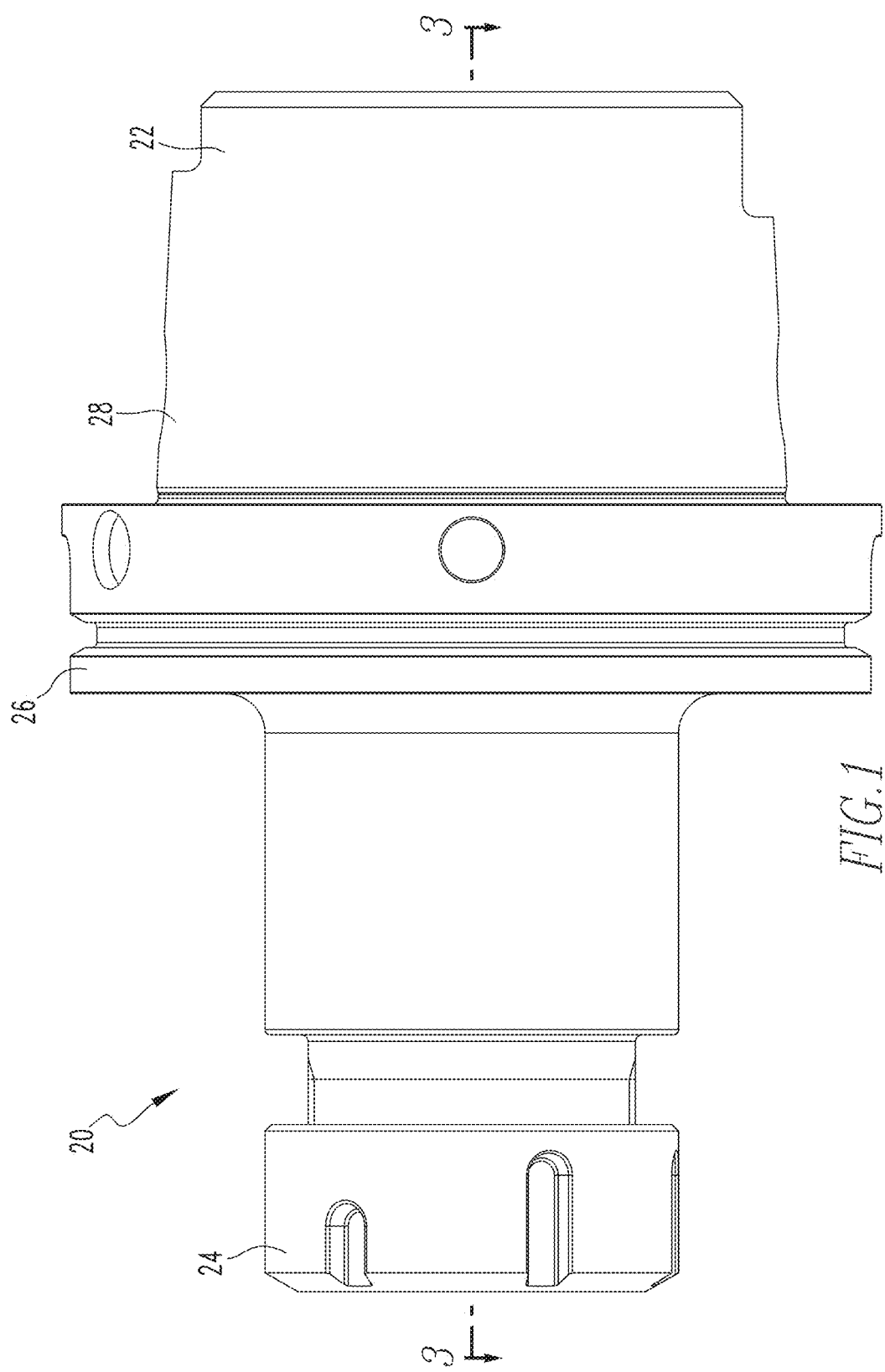
FIG. 1 is a side view of a tool holder in accordance with an embodiment of the present invention.
Figure 2:
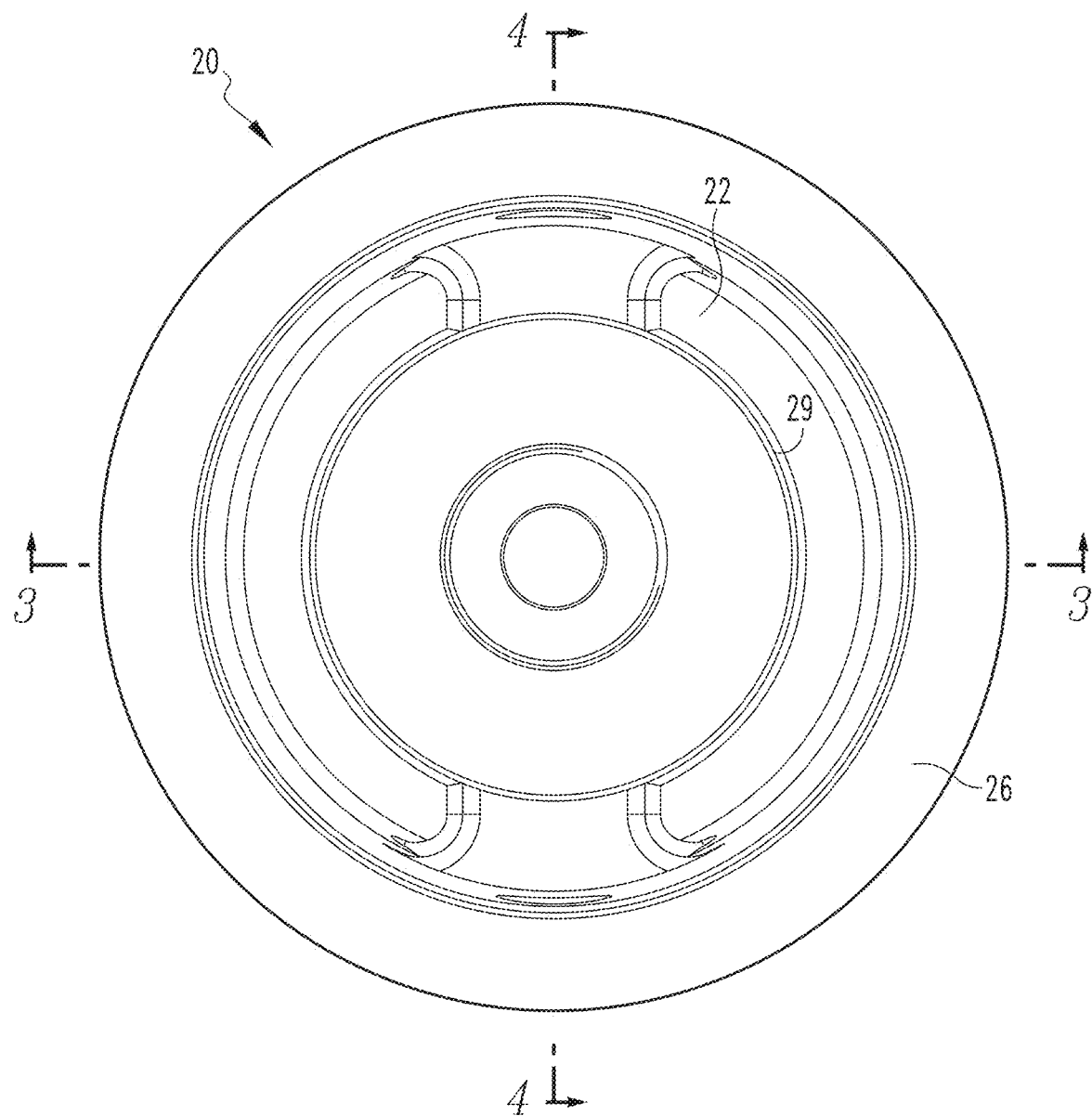
FIG. 2 is a right end view of the tool holder of FIG. 1
Figure 3:
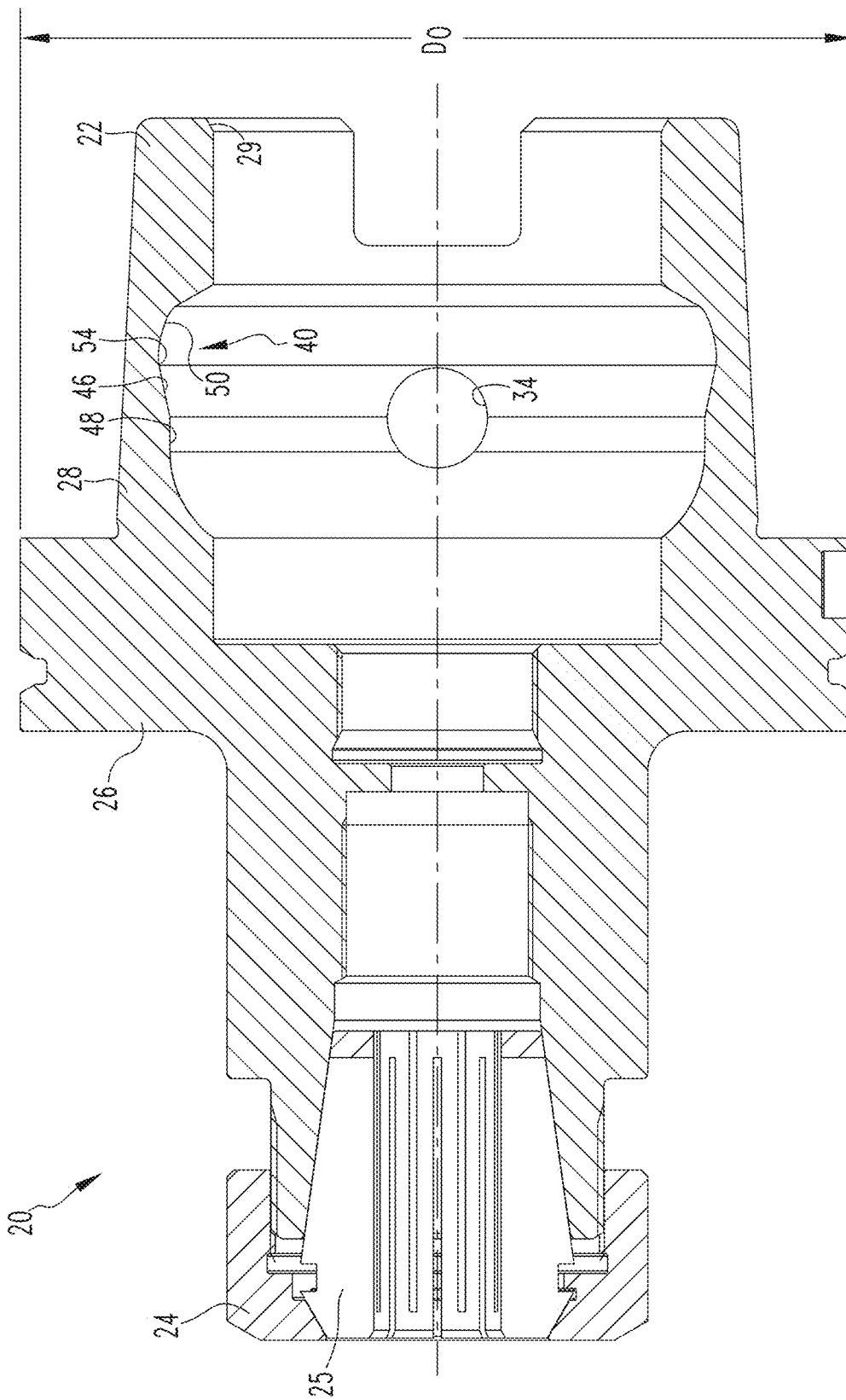
FIG. 3 is a longitudinal sectional view of a tool holder taken through line 3-3 of FIGS. 1 and 2.

FIG. 1 illustrates a side view of a hollow shank tool holder 20 in accordance with an embodiment of the present invention. As shown in FIGS. 1-3, the tool holder 20 may be a hollow stepped flange comprising a first mounting end 22 and a second cutting end 24. In accordance with an embodiment of the present invention, the first end 22 is typically inserted into a spindle unit and a cutting tool may be attached to or integrally formed with a bore 25 of the second end 24. In accordance with an embodiment of the present invention, the tool holder 20 comprises a flange portion 26 and a taper shank portion 28. As shown in FIGS. 1-4, the flange portion 26 is located between the first mounting end 22 and the second cutting end 24 and the taper shank portion 28 extends from the flange portion 26 to the first mounting end 22.

Figure 4:
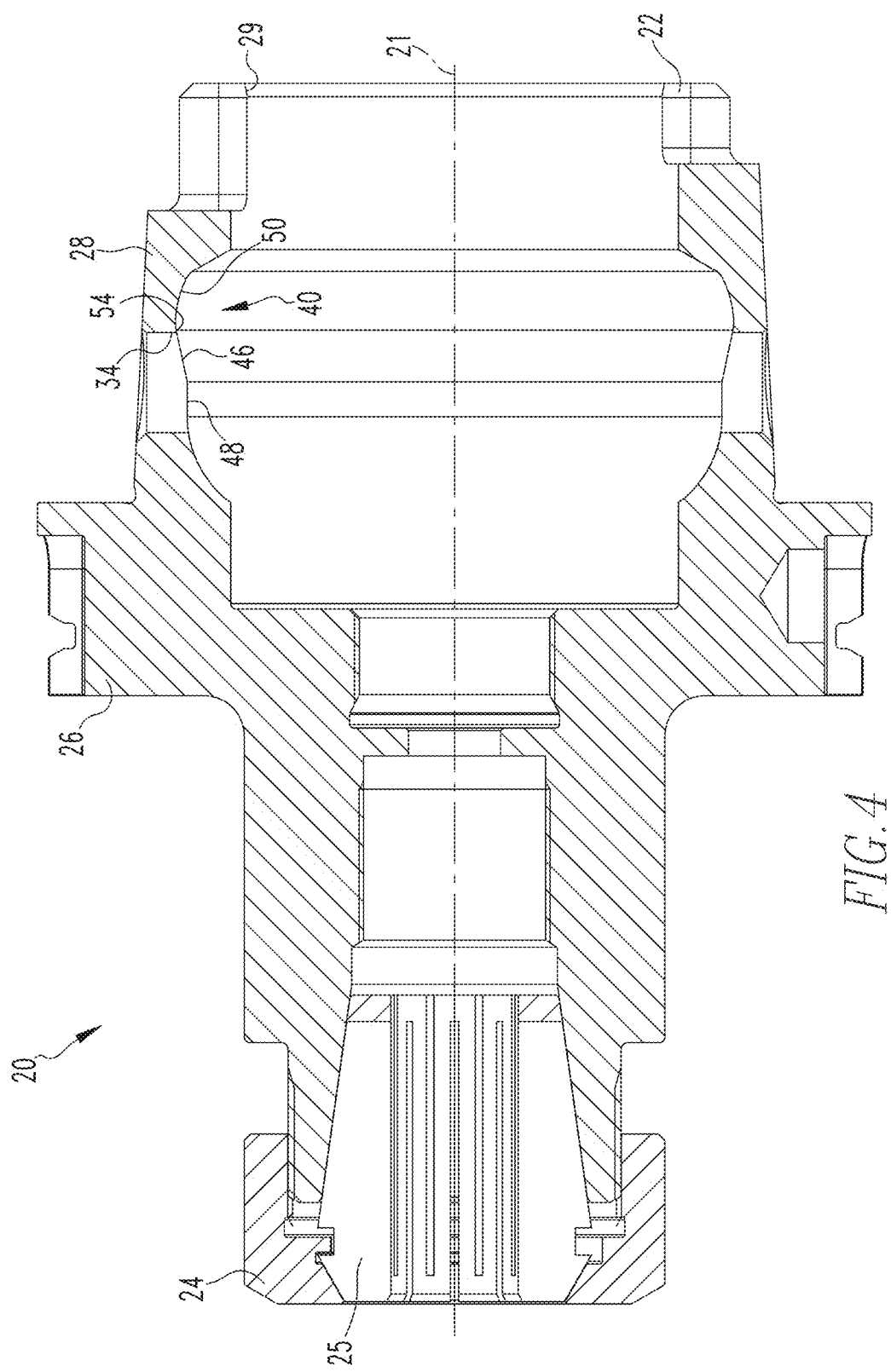
FIG. 4 is a longitudinal sectional view of a tool holder taken through line 4-4 of FIG. 2.

As shown in FIGS. 2-4, the taper shank portion 28 comprises an opening 29 at the first mounting end 22 of the taper shank portion 28 of the tool holder 20. As shown in FIGS. 2 and 4, the center of the opening 29 of the taper shank portion 28 corresponds to a central longitudinal axis 21 of the tool holder 20. The central longitudinal axis 21 extends along the tool holder 20 from the first mounting end 22 to the second cutting end 24. In accordance with an embodiment of the present invention, the central longitudinal axis 21 defines a rotary axis of the tool holder 20.

Figure 5:
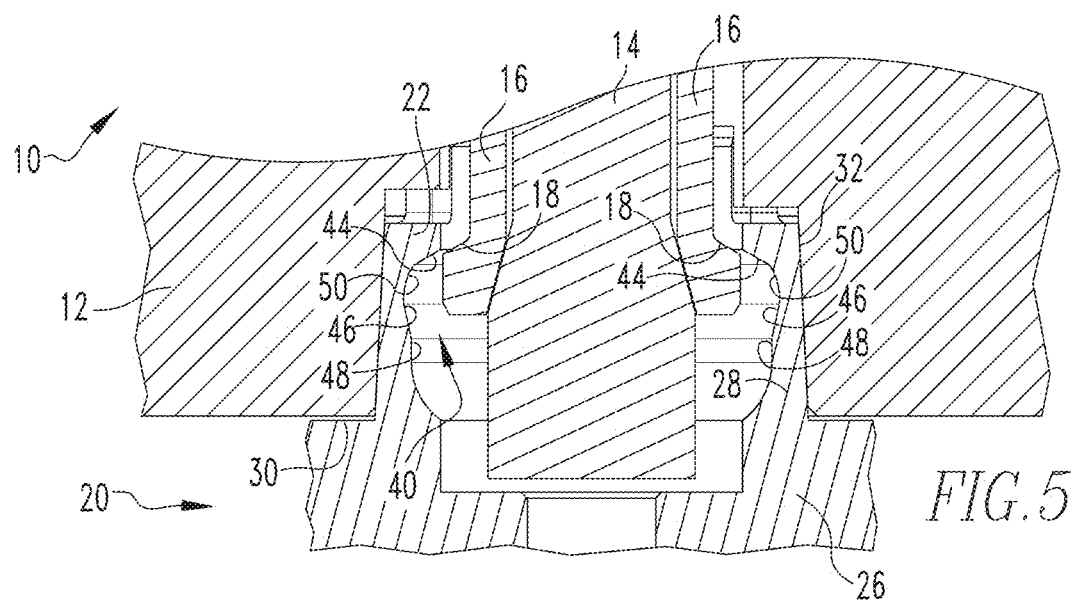
FIG. 5 is a longitudinal sectional view of a portion of a tool holder and a spindle unit in an unclamped state in accordance with an embodiment of the present invention.
Figure 6:
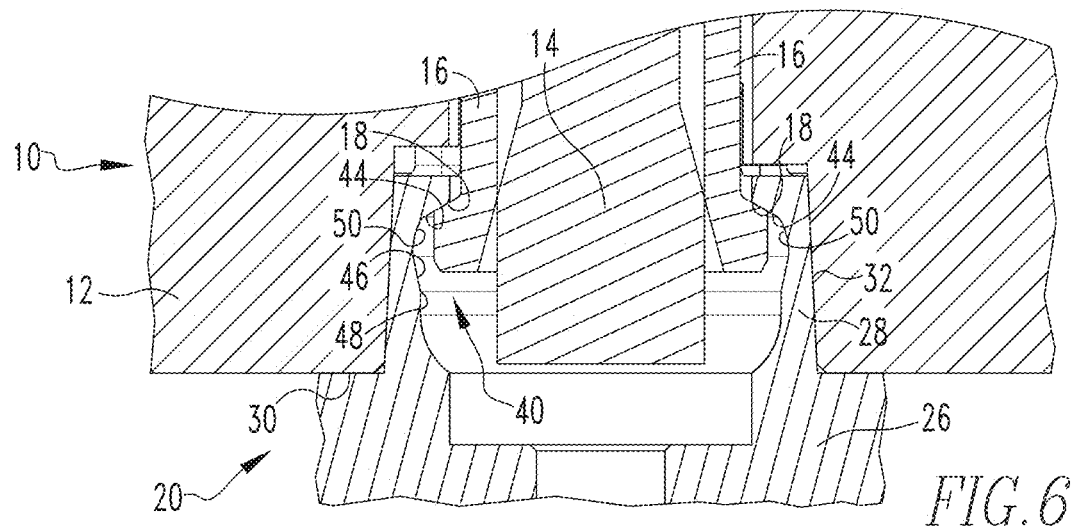
FIG. 6 is a longitudinal sectional view of a portion of a tool holder and a spindle unit in a clamped state in accordance with an embodiment of the present invention

FIG. 5 is a longitudinal sectional view of a spindle unit 10 and a hollow shank tool holder 20 in an unclamped state. The spindle unit 10 comprises a spindle 12, a draw bar 14, and clamping fingers 16 in accordance with an embodiment of the present invention. In accordance with an embodiment of the present invention, the draw bar 14 and the clamping fingers 16 provide the clamping assembly of the spindle unit 10. As shown in FIGS. 5 and 6, the clamping fingers 16 include clamping surfaces 18 structured and arranged to engage an inner surface of the tool holder 20, as more fully described below. The clamping fingers 16 are forced radially outwards to clamp the hollow shank tool holder 20 in the spindle unit 10. As understood by those skilled in the art, hollow shank tool holders are also known as HSK tool holders. As used herein, the term "elliptical" means a shape having two radius measurements, one horizontally along the x-axis, the other vertically along the y-axis.

Figure 8:
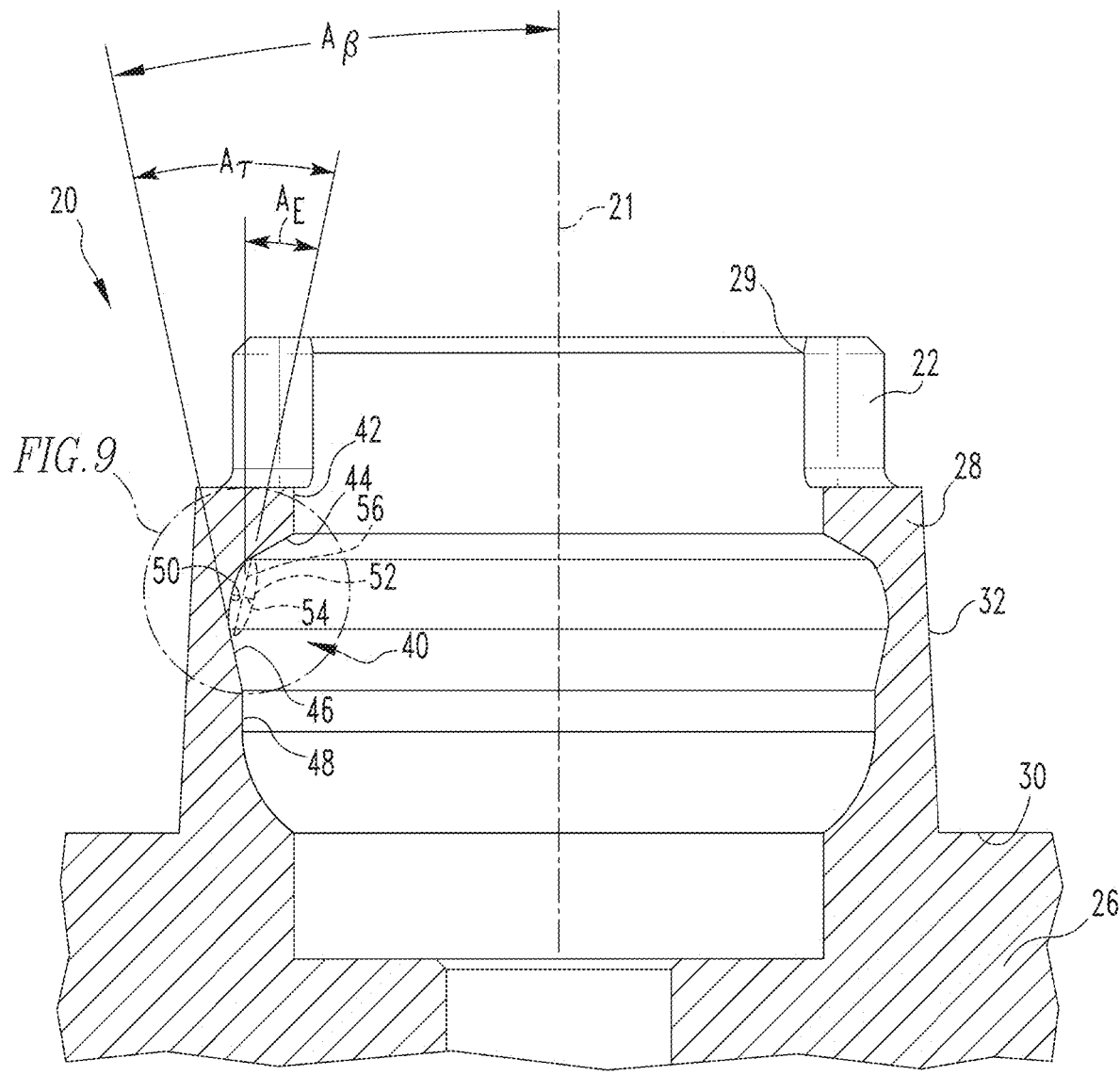
FIG. 8 is a longitudinal sectional view of a portion of a tool holder in accordance with an embodiment of the present invention.

In accordance with an embodiment of the present invention, the opening 29 is structured and arranged to receive the draw bar 14 and clamping fingers 16 of the spindle unit 10. The internal volume and dimensions of the tool holder 20 may be varied depending on the spindle unit 10 and the desired application. In the embodiment shown, the opening 29 is beveled, however, any other suitable arrangement may be used, e.g., radiused, straight or the like. As shown in FIG. 8, the outer diameter $D_O$ of the flange portion 26 of the tool holder 20 may typically range from 25 to 180 mm, e.g., from 32 to 160 mm.

Figure 7:
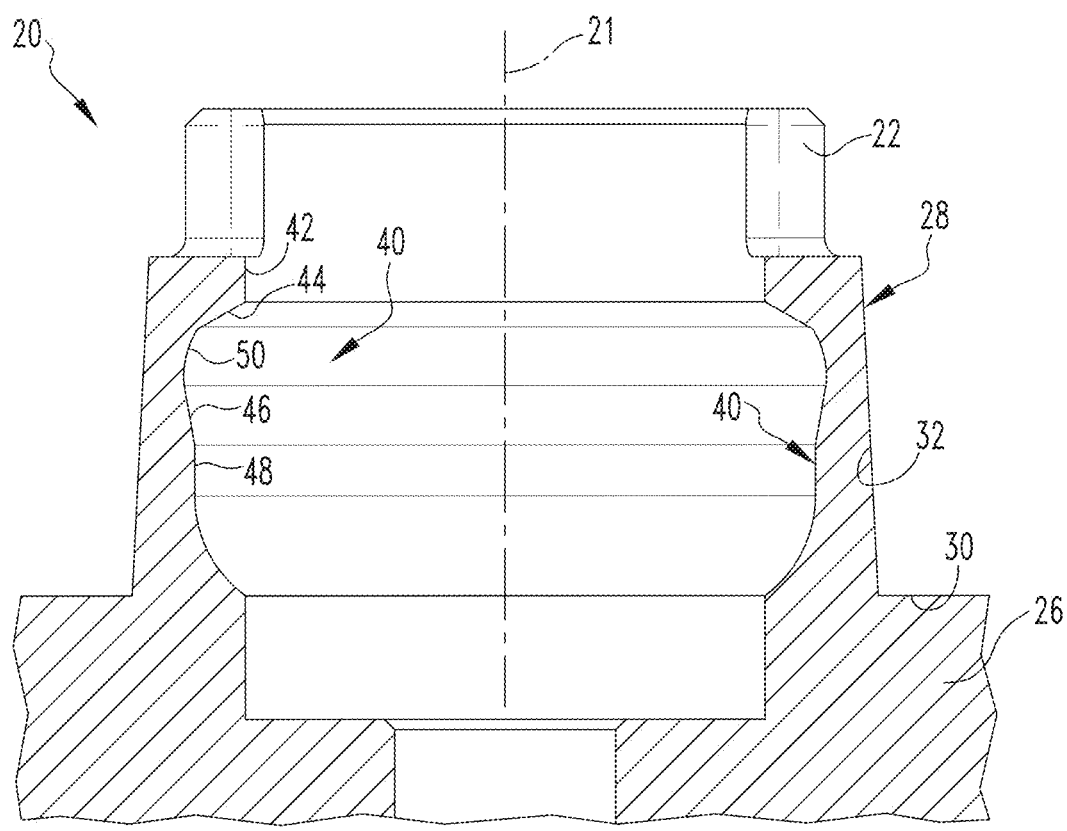
FIG. 7 is a longitudinal sectional view of a portion of a tool holder in accordance with an embodiment of the present invention.

The tool holder 20 further includes a tool end surface 30 and a tool taper surface 32 structured and arranged to position the tool holder 20 in the spindle unit 10. As shown in FIG. 7, the tool end surface 30 may be perpendicular to a rotary axis of the tool holder 20 and may be adjacent to or contact the spindle 12 when the tool holder 20 is clamped. As shown in FIG. 7, the tool taper surface 32 forms an outer peripheral surface of the taper shank portion 28. The tool taper surface 32 is inclined from the rotary axis of the tool holder 20 by a desired angle and assists in centering the tool holder 20 in the spindle unit 10. In accordance with an embodiment of the present invention, the tool taper surface 32 may be provided at any suitable angle from the rotary axis of the tool holder 20.

As shown in FIGS. 3-9, the taper shank portion 28 comprises an inner peripheral surface 40 configured for receiving the spindle unit 10. The taper shank portion 28 comprises a thickness between the tool taper surface 32 and the inner peripheral surface 40. The thickness is selected to allow for the inner peripheral surface 40 of the tool holder 20 to receive the spindle unit. In accordance with an embodiment of the present invention, the inner peripheral surface 40 comprises a radially inwardly extending cylindrical collar 42, a clamp retaining surface 44, an elliptical contoured relief surface 50 having a first end 58 and a second end 59, a radially outwardly tapered surface 46 and a cylindrical surface 48. In accordance with an embodiment of the present invention, the radially inwardly extending collar 42 may be adjacent to the first end 22 of the tool holder 20 and extend from the opening 29 along the central longitudinal axis 21, the clamp retaining surface 44 may be adjacent to the radially inwardly extending collar 42, the first end 58 of the contoured relief surface 50 may be adjacent to the clamp retaining surface 44, the radially outwardly tapered surface 46 may be adjacent to the second end 59 of the contoured relief surface 50 and the cylindrical surface 48 may be adjacent to the radially outwardly tapered surface 46. As shown in FIGS. 5 and 6, the inner peripheral surface 40 of the tool holder 20 is structured and arranged to receive the draw bar 14 and clamping fingers 16 of the spindle unit 10.

In accordance with an embodiment of the present invention, the clamp retaining surface 44 is structured and arranged to engage with the clamping surface 18 of the clamping fingers 16 of a spindle unit 10. In accordance with an embodiment of the present invention, the clamp retaining surface 44 is radially inwardly tapered along the longitudinal axis of the tool holder 20 toward the opening 29. The radial inward taper allows the clamp retaining surface to engage the clamping surface 18 of the clamping fingers 16. In the embodiment shown, the clamp retaining surface 44 is generally conical, however, any other suitable shape may be used to provide a radially inward taper. In accordance with an embodiment of the present invention, the inward taper and shape may be varied depending on the clamping fingers 16 of the spindle unit 10. In accordance with an embodiment of the present invention, the clamp retaining surface 44 may extend from the radially inwardly extending collar 42 to the contoured relief surface 50 to provide a clamping length Lc that allows for the clamping surface 18 to be fully received thereon. In accordance with an embodiment of the present invention, a minimum length Lc of the clamp retaining surface 44 may be maintained to provide a minimum clamping length. Thus, the thickness of the taper shank portion 28 cannot be increased to provide additional material at the location between the clamp retaining surface 44 and the contoured relief surface 50.

In accordance with an embodiment of the present invention, the contoured relief surface 50 provides a longer transition between the clamp retaining surface 44 and the remainder of the inner peripheral surface 40, e.g., the contoured relief surface 50 provides a transition between the clamp retaining surface 44 and the radially outwardly tapered surface 46. In accordance with an embodiment of the present invention, the contoured relief surface 50 is formed as an elliptical undercut 52. The contoured relief surface 50 being formed with an elliptical undercut 52 allows for the radius of curvature between the clamp retaining surface 44 and the remainder of the inner peripheral surface 40 to be increased. However, any other suitable shape of contoured relief surface 50 may be used, e.g., circular or the like.

Figure 9:
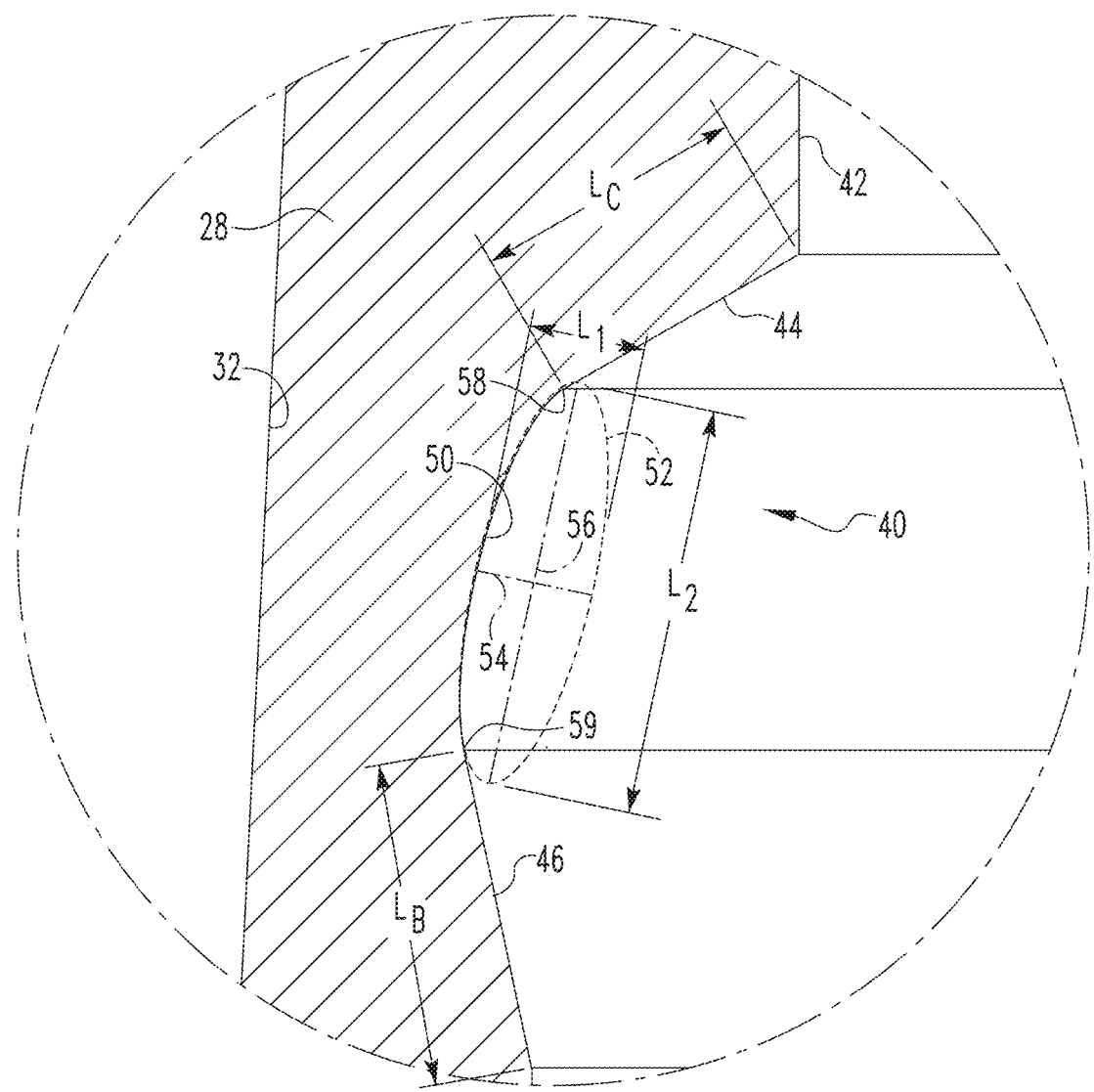
FIG. 9 is a magnified view of a portion of the tool holder of FIG. 4.

As shown in FIG. 9, the elliptical undercut 52 of the contoured relief surface 50 comprises a minor axis 54 and a major axis 56. As shown in FIG. 9, the minor axis 54 may have a length $L_1$ and the major axis 56 may have a length $L_2$. The length $L_1$ of the minor axis 54 of the elliptical undercut 52 of the contoured relief surface 50 determines the depth of the undercut in the thickness of the taper shank portion 28. For example, the minor axis 54 of the elliptical undercut 52 of the contoured relief surface 50 may have a length $L_1$ ranging from 0.25 to 7.5 mm, for example, from 0.5 to 5 mm or from 0.75 to 2 mm. The length $L_2$ of the major axis 56 of the elliptical undercut 52 of the contoured relief surface 50 determines the length of the transition between the clamp retaining surface 44 and the radially outwardly tapered surface 46. For example, the major axis 56 of the elliptical undercut 52 of the contoured relief surface 50 may have a length $L_2$ ranging from 0.5 to 10 mm, for example, from 1 to 7.5 mm or from 2 to 6 mm. The length $L_1$ of the minor axis 54 and the length $L_2$ of the major axis 56 can be adjusted depending on the overall size of the tool holder 20 and the outer diameter of the flange portion 26. The ratio of the length $L_1$ of the minor axis 54 to the length $L_2$ of the major axis 56 may typically range from 1:1.25 to 1:10, for example, from 1:1.5 to 1:5 or from 1:2 to 1:3.

In accordance with an embodiment of the present invention, the ratio of the length Lc of the clamp retaining surface 44 to the length $L_2$ of the major axis 56 may typically range from 3:1 to 1:5, for example, from 1.5:1 to 1:3 or from 1:1 to 1:2. In certain embodiments, the length of the length $L_2$ of the major axis 56 may be at least 50 percent of the length Lc of the clamp retaining surface 44. For example, the length of the length $L_2$ of the major axis 56 may be at least 75 percent, or at least 100 percent, or at least 120 percent of the length Lc of the clamp retaining surface 44.

In accordance with an embodiment of the present invention, the minor axis 54 of the elliptical undercut 52 reduces the thickness of the taper shank portion 28 adjacent to the contoured relief surface 50. In accordance with an embodiment of the present invention, while the thickness of the taper shank portion 28 is reduced by the elliptical undercut 52 of the relief portion 50, the contoured relief surface 50 provides the taper shank portion 28 with increased strength.

As shown in FIG. 8, the major axis 56 of the elliptical undercut 52 of the contoured relief surface 50 is provided at a radially inward tilt angle $A_E$ from the rotary axis of the tool holder 20 that allows a first end 58 of the contoured relief surface to be tangent to a portion of the clamp retaining surface 44. For example, the tilt angle $A_E$ may be at least 1 degree, for example, from 5 to 50 degrees, or from 7.5 to 30 degrees, or from 10 to 15 degrees. In a particular embodiment the tilt angle $A_E$ of the major axis 56 of the elliptical undercut 52 of the contoured relief surface 50 may be about 12 degrees. As a result of the first end 58 of the contoured relief surface 50 being tangent to a portion of the clamp retaining surface 44, a stress point between the clamp retaining surface 44 and the remainder of the inner peripheral surface 40 is substantially reduced. In accordance with another embodiment of the present invention, the inner peripheral surface 40 may include a concave indented portion (not shown) between the first end 58 of the contoured relief surface 50 and the clamp retaining surface 44.

In accordance with an embodiment of the present invention, the radially outwardly tapered surface 46 is provided on the inner peripheral surface 40 of the tool holder 20 to transition from the contoured relief surface 50 to the cylindrical surface 48. In accordance with an embodiment of the present invention, the tapered surface 46 is tapered radially outwardly along the longitudinal axis of the tool holder 20 toward the opening 29. In the embodiment shown, the radially outwardly tapered surface 46 is generally conical, however, any other suitable shape may be used to provide a radially outward taper. As shown in FIG. 9, the radially outwardly tapered surface 46 extends a length $L_B$ from the contoured relief surface 50 to the cylindrical surface 48. In certain embodiments, the length of the length $L_2$ of the major axis 56 may be at least 50 percent of the length $L_B$ of the radially outwardly tapered surface 46. For example, the length of the length $L_2$ of the major axis 56 may be at least 75 percent, or at least 100 percent, or at least 120 percent of the length $L_B$ of the radially outwardly tapered surface 46. As shown in FIG. 8, the radially outwardly tapered surface 46 of the inner peripheral surface 40 of the tool holder 20 is provided at a transition angle $A_\beta$ from the rotary axis of the tool holder 20 that allows a second end 59 of the contoured relief surface 50 to be tangent to a portion of the radially outwardly tapered surface 46. For example, the transition angle $A_\beta$ may be at least 1 degree, for example, from 2.5 to 45 degrees, or from 5 to 25 degrees, or from 7.5 to 12.5 degrees. In a particular embodiment, the transition angle $A_\beta$ of the major axis 56 of the radially outwardly tapered surface 46 may be about 10 degrees. In the embodiment shown, the transition angle $A_\beta$ provides for the thickness of the taper shank portion 28 to be greater at the intersection of the radially outwardly tapered surface 46 and the parallel portion 48 than at the intersection of the radially outwardly tapered surface 46 and the contoured relief surface 50.

However, in accordance with another embodiment of the present invention, the radially outwardly tapered surface 46 may be cylindrical and substantially parallel to the rotary axis of the tool holder 20.

As shown in FIG. 8, the major axis 56 of the elliptical undercut 52 is offset from the radially outwardly tapered surface 46 by a total angle $A_T$. In accordance with an embodiment of the present invention the total angle $A_T$ may be equal to the sum of the tilt angle $A_E$ and the transition angle $A_\beta$. For example, the total angle $A_T$ may be at least 5 degrees, for example, from 10 to 90 degrees, or from 15 to 55 degrees, or from 17.5 to 27.5 degrees. The ratio of the transition angle $A_\beta$ of the radially outwardly tapered surface 46 to the tilt angle $A_E$ of the elliptical undercut 52 may typically range from 5:1 to 1:5, for example, from 3:1 to 1:3 or from 1:1 to 1:1.5. In a particular embodiment, the ratio of the transition angle $A_\beta$ of the radially outwardly tapered surface 46 to the tilt angle $A_E$ of the elliptical undercut 52 may be about 1:1.2.

Figure 10:
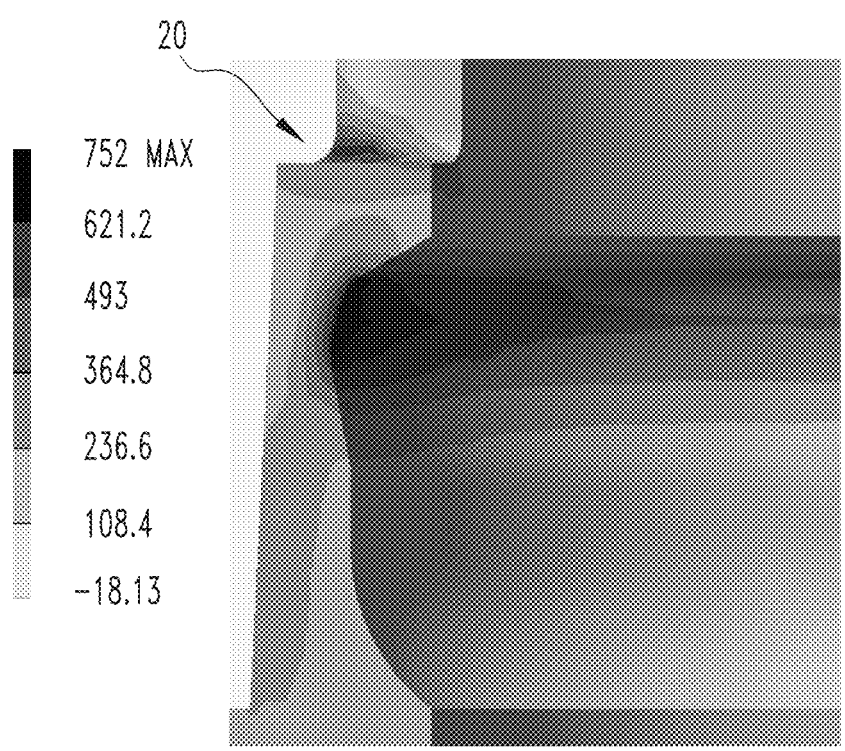
FIGS. 10 and 11 show the results of a stress analysis on a tool holder in accordance with an embodiment of the present invention in a finite element analysis program.
Figure 11:
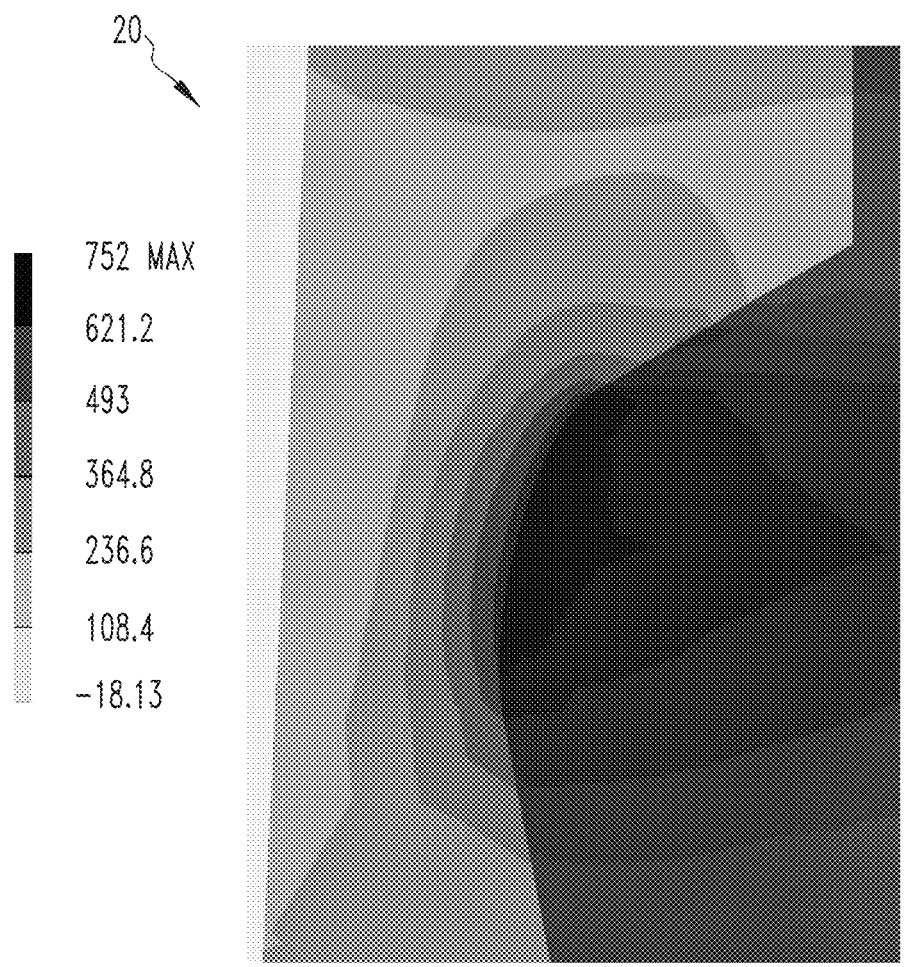
Figure 12:
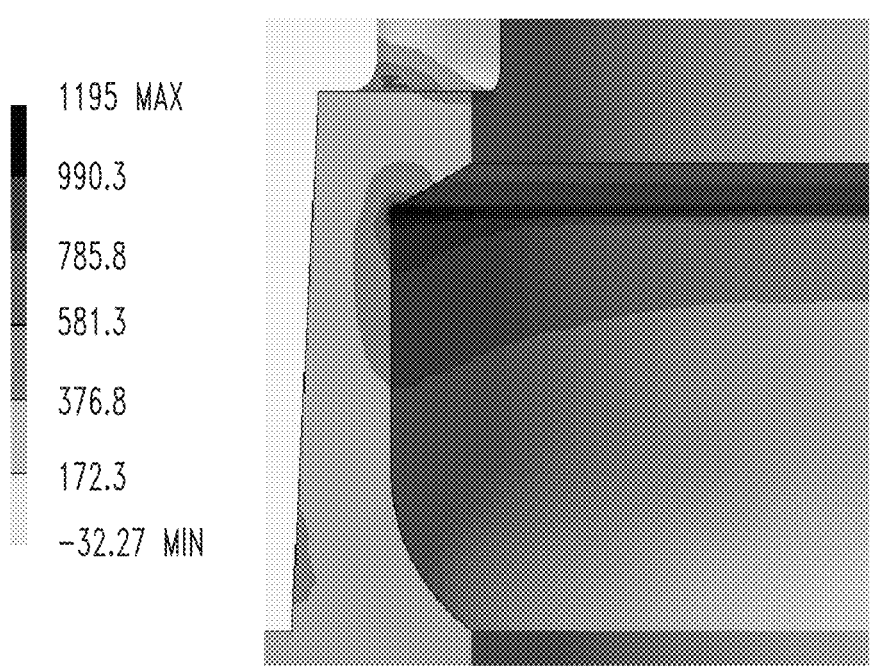
FIG. 12 shows the results of a stress analysis on a prior art tool holder in a finite element analysis program.

FIGS. 10-12 illustrate the results of Finite Element Analysis performed in ANSYS R19.1. As shown in FIGS. 10 and 11, increasing the radius of curvature between the clamp retaining surface 44 and the remainder of the inner peripheral surface 40 allows for the stress concentration between the clamp retaining surface 44 and inner diameter of the tool holder 20 to be reduced. As shown, the maximum stress on the relief surface 50 may be spread along the major axis of the elliptical undercut.

As shown in FIG. 12, prior art hollow shank tool holders comprise a small radius between the clamp retaining surface and the remainder of the inner peripheral surface of the hollow shank taper. This radius results in stress being concentrated at a single area of the inner surface of the tool holder.

For example, as shown in FIGS. 10 and 11, the tool holder 20 of the present invention may experience a maximum principal stress of 751.96 MPa at the relief surface 50 provided between the clamp retaining surface 44 and the remainder of the inner peripheral surface 40. For example, as shown in FIG. 12, the prior art tool holder may experience a maximum principal stress of 1195 MPa at the small radius provided between the clamp retaining surface and the remainder of the inner peripheral surface. Accordingly, allowing the maximum principal stress to be spread along the contoured relief surface reduces the maximum principal stress in any single location. For example, the maximum principal stress experienced at any single point may be reduced by at least 5 percent, for example, at least 10 percent, or at least 20 percent, or at least 30 percent, or at least 35 percent, or at least 37 percent.

The hollow shank tool holder 20 may be made of any suitable material, such as steel, aluminum, titanium or any other material having sufficient strength. The inner peripheral surface 40 of the present invention may be fabricated by any suitable technique, such as machining or forging to provide the contoured relief surface and the radially outwardly tapered surface.

In accordance with an embodiment of the present invention, inner peripheral surface 40 of the tool holder 20 may be subjected to one or more conventionally known surface finish processes, including shot peening and the like. The inner peripheral surface 40 may be shot peened by impacting the surface with shot e.g., round metallic, glass, ceramic particles or the like, with force sufficient to create plastic deformation. The shot peening process may produce a compressive residual stress layer and improves mechanical properties of the tool holder of the present invention.

As used herein, "including," "containing" and like terms are understood in the context of this application to be synonymous with "comprising" and are therefore open-ended and do not exclude the presence of additional undescribed or unrecited elements, materials, phases or method steps. As used herein, "consisting of" is understood in the context of this application to exclude the presence of any unspecified element, material, phase or method step. As used herein, "consisting essentially of" is understood in the context of this application to include the specified elements, materials, phases, or method steps, where applicable, and to also include any unspecified elements, materials, phases, or method steps that do not materially affect the basic or novel characteristics of the invention.

For purposes of the description above, it is to be understood that the invention may assume various alternative variations and step sequences except where expressly specified to the contrary. Moreover, all numbers expressing, for example, quantities of ingredients used in the specification and claims, are to be understood as being modified in all instances by the term "about". Accordingly, unless indicated to the contrary, the numerical parameters set forth are approximations that may vary depending upon the desired properties to be obtained by the present invention. At the very least, and not as an attempt to limit the application of the doctrine of equivalents, each numerical parameter should at least be construed in light of the number of reported significant digits and by applying ordinary rounding techniques.

It should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. In this application, the articles "a," "an," and "the" include plural referents unless expressly and unequivocally limited to one referent.

Whereas particular embodiments of this invention have been described above for purposes of illustration, it will be evident to those skilled in the art that numerous variations of the details of the present invention may be made without departing from the invention as defined in the appended claims.

What is claimed is:

1. A hollow shank tool holder comprising:
   a taper shank portion structured and arranged to receive a clamping assembly of a spindle unit, the taper shank portion comprising:
      a mounting end having an opening, the opening defining a longitudinal axis of the hollow shank tool holder extending from the mounting end to a cutting end of hollow shank tool holder; and
      an inner peripheral surface, the inner peripheral surface comprising:
         a radially inwardly extending collar adjacent to the mounting end extending along the longitudinal axis from the opening;
         a radially inwardly tapered conical clamp retaining surface extending from the radially inwardly extending collar, the radially inwardly tapered conical clamp retaining surface structured and arranged to engage an opposing conical clamping surface of a clamping finger of a spindle unit;
         a contoured relief surface extending from the clamp retaining surface; and
         a radially outwardly tapered surface extending from the contoured relief surface tapered along the longitudinal axis toward the mounting end.

2. The hollow shank tool holder of claim 1, wherein a first end of the contoured relief surface is tangent to a portion of the clamp retaining surface.

3. The hollow shank tool holder of claim 1, wherein a second end of the contoured relief surface is tangent to a portion of the radially outwardly tapered surface.

4. The hollow shank tool holder of claim 1, wherein the radially outwardly tapered surface is a conical surface.

5. The hollow shank tool holder of claim 1, wherein the taper shank portion further comprises a cylindrical surface extending from the radially outwardly tapered surface, and a curved surface extending from the cylindrical surface.

6. The hollow shank tool holder of claim 5, wherein a first thickness of the taper shank portion adjacent to the contoured relief surface is less than a second thickness of the taper shank portion at adjacent to the cylindrical surface.

7. The hollow shank tool holder of claim 1, wherein the contoured relief surface comprises an elliptical undercut.

8. The hollow shank tool holder of claim 1, wherein a major axis of the elliptical undercut is at a radially inward tilt angle from the longitudinal axis of the hollow shank tool holder.

9. The hollow shank tool holder of claim 8, wherein the radially inward tilt angle ranges from 5 to 50 degrees.

10. The hollow shank tool holder of claim 8, wherein the ratio of the radially inward tilt angle to a transition angle of the radially outwardly tapered surface is from 3:1 to 1:3.

11. The hollow shank tool holder of claim 7, wherein the radially outwardly tapered surface is offset from a major axis of the elliptical undercut by a total angle.

12. The hollow shank tool holder of claim 11, wherein the total angle ranges from 10 to 90 degrees.

13. The hollow shank tool holder of claim 7, wherein the ratio of a length of the clamp retaining surface to a length of a major axis of the elliptical undercut of the contoured relief surface is from 1.5:1 to 1:3.

14. The hollow shank tool holder of claim 7, wherein a major axis of the elliptical undercut has a length of from 0.5 to 10 mm and a minor axis of the elliptical undercut has a length of from 0.25 to 7.5 mm.

15. The hollow shank tool holder of claim 14, wherein the ratio of the length of the minor axis of the elliptical undercut to the length of the major axis of the elliptical undercut is from 1:1.25 to 1:10.

16. The hollow shank tool holder of claim 14, wherein the length of the major axis of the elliptical undercut is at least 75 percent of a clamping length of the clamp retaining surface.

17. The hollow shank tool holder of claim 1, wherein the radially outwardly tapered surface extends from the contoured relief surface at a transition angle from the longitudinal axis of the hollow shank tool holder.

18. The hollow shank tool holder of claim 17, wherein the transition angle is from 2.5 to 45 degrees.

19. The hollow shank tool holder of claim 1, wherein at least a portion of the inner peripheral surface is shot peened.

20. A hollow shank tool holder assembly comprising:

a spindle unit comprising a clamping assembly comprising: a spindle, a draw bar and at least one clamping finger comprising a conical clamping surface; and a hollow shank tool holder comprising a taper shank portion structured and arranged to receive the clamping assembly of the spindle unit, the taper shank portion comprising:

a mounting end having an opening, the opening defining a longitudinal axis of the hollow shank tool holder extending from the mounting end to a cutting end of hollow shank tool holder; and an inner peripheral surface, the inner peripheral surface comprising:

a radially inwardly extending collar adjacent to the mounting end extending along the longitudinal axis from the opening;

a radially inwardly tapered conical clamp retaining surface extending from the radially inwardly extending collar, the radially inwardly tapered conical clamp retaining surface structured and arranged to engage the conical clamping surface of the clamping finger of the spindle unit;

a contoured relief surface extending from the clamp retaining surface; and a radially outwardly tapered surface extending from the contoured relief surface tapered along the longitudinal axis toward the mounting end.

21. A hollow shank tool holder comprising:

a taper shank portion structured and arranged to receive a clamping assembly of a spindle unit, the taper shank portion comprising:

a mounting end having an opening, the opening defining a longitudinal axis of the hollow shank tool holder extending from the mounting end to a cutting end of hollow shank tool holder; and an inner peripheral surface, the inner peripheral surface comprising:

a radially inwardly extending collar adjacent to the mounting end extending along the longitudinal axis from the opening;

a tapered clamp retaining surface extending from the radially inwardly extending collar;

a contoured relief surface comprising an elliptical undercut extending from the clamp retaining surface, wherein a major axis of the elliptical undercut is at a radially inward tilt angle from the longitudinal axis of the hollow shank tool holder; and a radially outwardly tapered surface extending from the contoured relief surface tapered along the longitudinal axis toward the mounting end.

22. The hollow shank tool holder of claim 21, wherein the radially outwardly tapered surface is offset from a major axis of the elliptical undercut by a total angle, and wherein the total angle ranges from 10 to 90 degrees.

23. The hollow shank tool holder of claim 21, wherein the ratio of the radially inward tilt angle to a transition angle of the radially outwardly tapered surface is from 3:1 to 1:3.

24. The hollow shank tool holder of claim 21, wherein the ratio of a length of the clamp retaining surface to a length of a major axis of the elliptical undercut of the contoured relief surface is from 1.5:1 to 1:3.

25. The hollow shank tool holder of claim 21, wherein a major axis of the elliptical undercut has a length of from 0.5 to 10 mm and a minor axis of the elliptical undercut has a length of from 0.25 to 7.5 mm.

26. The hollow shank tool holder of claim 25, wherein the length of the major axis of the elliptical undercut is at least 75 percent of a clamping length of the clamp retaining surface.

* * * * *